US012117135B1

(12) United States Patent
Chen

(10) Patent No.: US 12,117,135 B1
(45) Date of Patent: Oct. 15, 2024

(54) LIGHT STRIP CONFIGURED TO FACILITATE SHAPE FORMING AND SHAPED LIGHT ORNAMENT COMPOSED THEREOF

(71) Applicant: ZHU HAI FUYUN LIGHTING INDUSTRIAL CO., LTD., Zhuhai (CN)

(72) Inventor: Suhua Chen, Zhuhai (CN)

(73) Assignee: ZHU HAI FUYUN LIGHTING INDUSTRIAL CO., LTD., Zhuhai (CN)

( * ) Notice: Subject to any disclaimer, the term of this patent is extended or adjusted under 35 U.S.C. 154(b) by 0 days.

(21) Appl. No.: 18/622,173

(22) Filed: Mar. 29, 2024

Related U.S. Application Data

(63) Continuation-in-part of application No. 18/355,069, filed on Jul. 19, 2023, which is a continuation-in-part of application No. PCT/CN2023/089166, filed on Apr. 19, 2023.

(30) Foreign Application Priority Data

Mar. 30, 2023 (CN) ........................ 202320683400.1
Feb. 19, 2024 (CN) ........................ 202420305087.2

(51) Int. Cl.

| | |
|---|---|
| ***F21S 4/22*** | (2016.01) |
| ***F21V 15/01*** | (2006.01) |
| ***F21V 21/16*** | (2006.01) |
| ***F21V 21/32*** | (2006.01) |

(Continued)

(52) U.S. Cl.
CPC .............. *F21S 4/22* (2016.01); *F21V 15/012* (2013.01); *F21V 21/16* (2013.01); *F21V 21/32* (2013.01); *F21Y 2103/10* (2016.08); *F21Y 2115/10* (2016.08)

(58) Field of Classification Search
CPC .......... F21S 4/22; F21V 15/012; F21V 21/16; F21V 21/32; F21Y 2103/10
See application file for complete search history.

(56) References Cited

U.S. PATENT DOCUMENTS 6,186,645 B1 2/2001 Camarota
8,366,291 B2 * 2/2013 Hoffmann .............. F21S 8/022 362/225
10,520,143 B1 12/2019 Findlay et al.
(Continued)

FOREIGN PATENT DOCUMENTS

CN 101858527 A 10/2010
CN 205716625 U 11/2016
(Continued)

*Primary Examiner* — Evan P Dzierzynski
(74) *Attorney, Agent, or Firm* — RABIN & BERDO, P.C.

(57) ABSTRACT

A light strip configured to facilitate shape forming includes a flexible member and a light emitting assembly. The flexible member has a continuously extending elongated shape and includes a light transmissive portion and a cavity arranged at an internal thereof. The light emitting assembly includes a plurality of light emitting elements arranged at intervals inside the cavity. The flexible member includes a slot arranged at one side and extending in the same direction as the flexible member and is used for clamping securement to a stand portion formed by a metal wire, in order to form a planar or three-dimensional shaped light ornament.

20 Claims, 19 Drawing Sheets

(51) Int. Cl.
*F21Y 103/10* (2016.01)
*F21Y 115/10* (2016.01)

(56) References Cited

U.S. PATENT DOCUMENTS

| | | | | |
|---|---|---|---|---|
| 11,162,654 | B2 | 11/2021 | Walsh et al. | |
| 11,655,946 | B1 | 5/2023 | Zhang | |
| 2003/0193803 | A1* | 10/2003 | Lin | F21S 4/24 362/800 |
| 2005/0231947 | A1* | 10/2005 | Sloan | G09F 9/33 362/235 |
| 2016/0025278 | A1* | 1/2016 | Camarota | F21V 15/012 29/428 |
| 2023/0071594 | A1* | 3/2023 | Chen | F21S 4/24 |

FOREIGN PATENT DOCUMENTS

| | | | |
|---|---|---|---|
| CN | 206918736 | U | 1/2018 |
| CN | 207230250 | U | 4/2018 |
| DE | 202016106375 | U1 | 11/2016 |
| WO | 2015157898 | A1 | 10/2015 |

* cited by examiner

LIGHT STRIP CONFIGURED TO FACILITATE SHAPE FORMING AND SHAPED LIGHT ORNAMENT COMPOSED THEREOF

BACKGROUND OF THE INVENTION

1. Technical Field

The present invention is related to a light strip, and in particular to a light strip structure configured to facilitate shape forming and a uniquely shaped light ornament composed of the light strip.

2. Description of Related Art

A currently available flexible silicone light strip mainly consists of a light transmissive (meaning as light-permeable) flexible silicone, an opaque flexible silicone, LED modules and a metal wire. The LED modules and metal wire are installed on the opaque flexible silicone and then concealed inside the light transmissive flexible silicone. The LED modules emit light via the light transmissive flexible silicone, which has a light-guiding effect. The metal wire with plastic deformation capability is able to provide plastic deformation for the light strip.

The currently available flexible silicone light strip has plastic deformation capability and can be used for field laying and installation with simple bending plastic deformation. Nevertheless, when it is used to construct a light ornament having a complicated pattern, the metal wire used for shape forming is only loosely installed inside the flexible wrapping material such that the precision of bending and curving cannot be ensured during the automated shape forming operation. As a result, it is difficult to form light ornaments of relatively complicated or exquisite patterns. If a manual method is adopted to form complicated shapes, the work load will be enormous, and repetitive adjustments will be required, which is time-consuming. In view of such drawbacks, currently available products are found to have limitations in shape forming and therefore cannot be used to create a uniquely shaped light ornament easily.

In view of the above, the inventor seeks to improve, and provide an innovative design capable of overcoming the drawbacks of, the currently available products by providing a light strip that is configured to facilitate shape forming and that can be easily installed and secured on a light stand formed by a metal wire, in order to achieve an exquisitely shaped light ornament.

BRIEF SUMMARY OF THE INVENTION

The primary objective of the present invention is to provide a light strip configured to facilitate installation and positioning in order to form a uniquely shaped light ornament, thereby reducing the difficulty of shape formation significantly and allowing exquisite and complicated shapes to be made easily.

Accordingly, the light strip configured to facilitate shape forming of the present invention mainly adopts the following technical means and structural features. The main body of the light strip includes a flexible member and a light emitting assembly. The flexible member has a continuously extending elongated shape and includes a light transmissive portion and a cavity formed inside the light transmissive portion, and the cavity extends along the extension direction of the flexible member. The light emitting assembly includes a plurality of light emitting elements arranged at intervals inside the cavity. The flexible member further includes a slot arranged at one side thereof and configured for clamping securement. The slot is formed between two protrusions with recovery elasticity, and an opening of the slot is formed at one side of the slot that is located away from the cavity. The slot, the two protrusions and the opening extend along the extension direction of the flexible member.

Furthermore, another objective of the present invention is to allow the light strip configured to facilitate shape forming to be attached to a uniquely shaped stand in order to form an exquisitely shaped light ornament.

The technical means and structural features adopted by the shaped light ornament include the light strip configured to facilitate shape forming of the present invention and a stand portion. The stand portion is formed by at least one flexibly shapable metal wire. In addition, the light strip uses the slot for clamping securement to the metal wire, such that the light strip is installed and fixed to the stand portion, thereby forming a planar or three-dimensional shaped light ornament.

According to the aforementioned structure, a projection of the slot in the extension direction has an arc shape, and the width of the opening of the slot is between the radius and the diameter of the slot. With such a structure, the slot having an inner surface of an arc shape is able to fit most of the commonly used metal wires in order to establish firm clamping securement, thereby increasing the overall adaptability of the product.

According to the aforementioned structure, the opening of the slot corresponds to a central angle of preferably 60~100 degrees. With such a structure, the slot can provide clamping securement to a metal wire in order to prevent disengagement.

According to the aforementioned structure, the flexible member may further include an appropriate light shielding portion to meet the need of unique design, thereby allowing the light strip to emit light in a predefined direction, so that the light strip and the shaped light ornament composed of the light strip are able to achieve diverse lighting effects. The light shielding portion may be any one of a first light shielding portion, a second light shielding portion and a third light shielding portion, as described below. The first light shielding portion is attached to one side of the light transmissive portion, and the slot is formed at the first light shielding portion. The second light shielding portion is attached to the side of the light transmissive portion that faces diametrically away from the first light shielding portion. The third light shielding portion is attached to one side of the light transmissive portion that is adjacent to the first light shielding portion, and the third shielding portion is connected to the first light shielding portion and the second light shielding portion separately.

Accordingly to the aforementioned structure, the flexible member further includes a hollow channel arranged at the light transmissive portion, in order to assist light diffusion and to increase the buffer capability, thereby allowing the light strip to produce a gentle light-emitting effect and to provide enhanced protection for the internal light emitting assembly against impact. In addition, the hollow channel and the slot may be arranged at opposite sides of the cavity, or the hollow channel and the third light shielding portion may be arranged at opposite sides of the cavity.

According to the aforementioned structure, the light emitting assembly further includes a conductor connected to the light emitting elements, the conductor is formed by at least one flexible conductive wire or a conductive board, and the conductor penetrates the cavity along the extension direction of the flexible member.

The present invention allows a metal wire to be directly shaped by automated processing and thus precisely bent and curved in order to construct a precise base stand. The entirety of the light strip is flexible such that it can be easily secured to a metal wire with the slot in order to complete installation and securement, thereby achieving an exquisitely shaped light ornament that cannot be easily formed by existing products. It can be known from the above that the present invention can significantly reduce the difficulty of shaping, features structural simplicity and convenient installation, and can be widely applied to the formation of uniquely shaped light ornaments having complicated and exquisite shapes.

Furthermore, an improved design is provided for the light strip configured to facilitate shape forming of the present invention and for a light ornament composed of the light strip, with a view to enhancing the lighting effect and three-dimensionality of the light strip and the light ornament. The improvement essentially involves changing the way in which the conductive board and the LED modules thereon (i.e., the light emitting elements) are disposed such that the LED modules face the inner side rather than the outer side. This allows the conductive board to be directly used to produce a certain shielding effect on the LED modules. Therefore, thanks also to the light scattering effect of the light transmissive portion of the flexible member, no bright spots will be formed on the outer side at positions corresponding to, and due to the high brightness of, the LED modules, wherein the bright spots can be unsightly if formed. In consequence, there is no need to provide additional light shielding portions on the outer side to shield such bright spots, and the brightness of the outer side is spared from being reduced by such light shielding portions. Inversing the conductive board and the LED modules thereon (i.e., the light emitting elements) allows the light strip and the light ornament composed thereof to produce a complete three-dimensional lighting effect.

The major means adopted by the foregoing improved light strip include a flexible member and a light emitting assembly. The flexible member has a continuously extending elongated shape and includes a light transmissive portion and a cavity formed inside the light transmissive portion. The cavity extends along the extension direction of the flexible member. The light emitting assembly includes a plurality of light emitting elements arranged at intervals inside the cavity and a conductor that connects the light emitting elements. The conductor is formed by a flexible conductive board and penetrates the cavity along the extension direction of the flexible member. The light emitting elements are LED modules attached to the conductive board. In addition, a slot is provided in one side of the flexible member and is configured for clamping securement. The slot is formed between two protrusions with recovery elasticity, and a side of the slot that is located away from the cavity is formed with an opening. The slot, the two protrusions and the opening extend along the extension direction of the flexible member to facilitate clamping securement to a continuously extending elongated carrier, thereby allowing the flexible member to be fixed to and shaped along the carrier. The flexible member is further formed with two opposite sides. One of the two opposite sides is an inner side provided with the slot, and the other of the two opposite sides is an outer side facing away from the slot. The conductive board has a first side to which the light emitting elements are attached and a second side facing away from the first side. The first side faces the inner side while the second side faces the outer side.

This improved structural design can be easily applied to the structures described further above to enhance the beauty of light emission from the end products, and the ease of the application is attributable to the fact that the change made to the orientation of the conductive board and the LED modules (i.e., the light emitting elements) will not be affected by the location of the slot, the provision of the hollow channel in the light transmissive portion, the provision of the first light shielding portion at a position corresponding to the slot, or the installation of the light strip on the stand portion to form a shaped light ornament.

The light transmissive portion of the flexible member includes an inner layer and an outer layer. The cavity is provided in the inner layer. The outer layer is provided on the outer side of the inner layer, and the outer layer has lower transmittance than the inner layer. The inner layer, which has relatively high transmittance, ensures that a relatively large amount of light will be allowed to penetrate the inner layer and then enter the outer layer. The outer layer, which has relatively low transmittance, can produce a relatively significant light-softening effect and thereby prevent the generation of glaring light. The projection of the inner layer in the extension direction has a rectangular shape to facilitate forming. The outer layer is a matte layer for providing a matte light-scattering effect. For example, the outer layer is made of a silicone material whose light-entering surface and/or light-exiting surface has a light scattering effect in order for the light emitted through the light transmissive portion as a whole to be relatively soft and even and thus provide enhanced visual comfort.

Moreover, the conductive board may be a conductive board that allows or does not allow passage of light. By using conductive boards that have different levels of transmittance, the intensity of light projected toward the outer side can be adjusted to meet different light emission requirements.

To further illustrate the aforementioned objectives, effects and technical features of the present invention, the following describes preferred embodiments of the present invention in conjunction with the accompanied drawings:

DETAILED DESCRIPTION OF THE INVENTION

Figure 1:
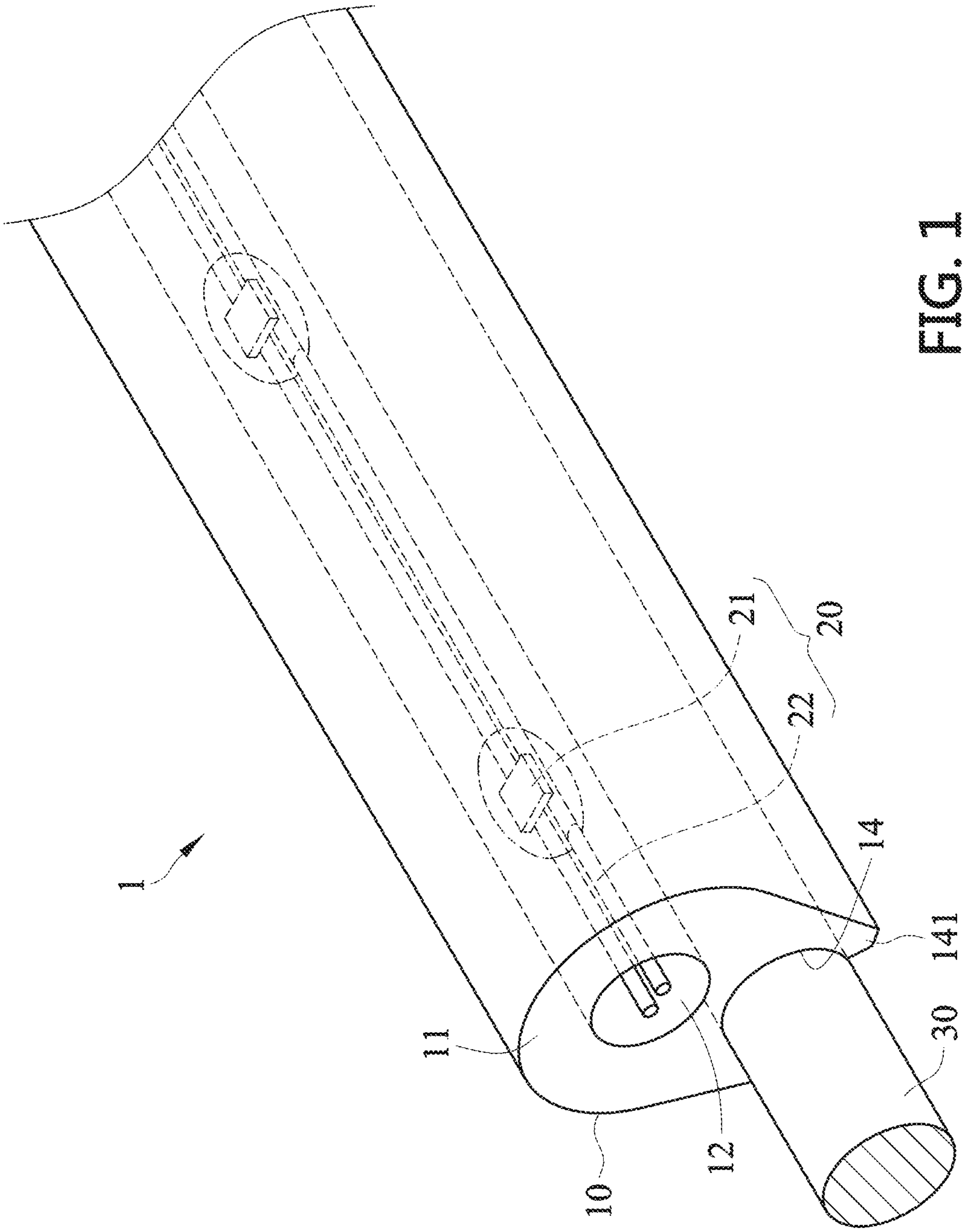
FIG. 1 is a perspective view of a basic light strip of the present invention, showing clamping securement of the light strip to a metal wire.
Figure 2:
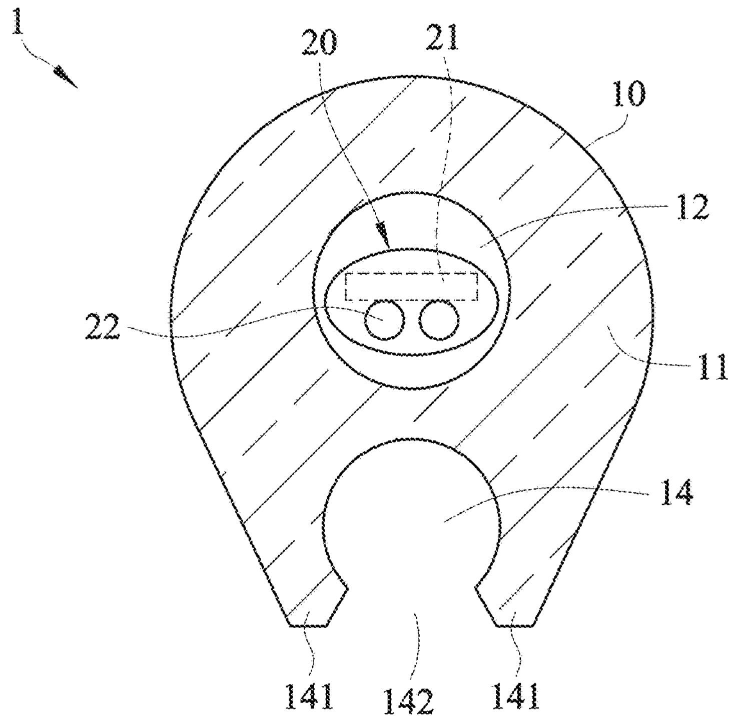
FIG. 2 is a cross sectional structural view of the light strip shown in FIG. 1, without clamping securement to the metal wire.
Figure 3:
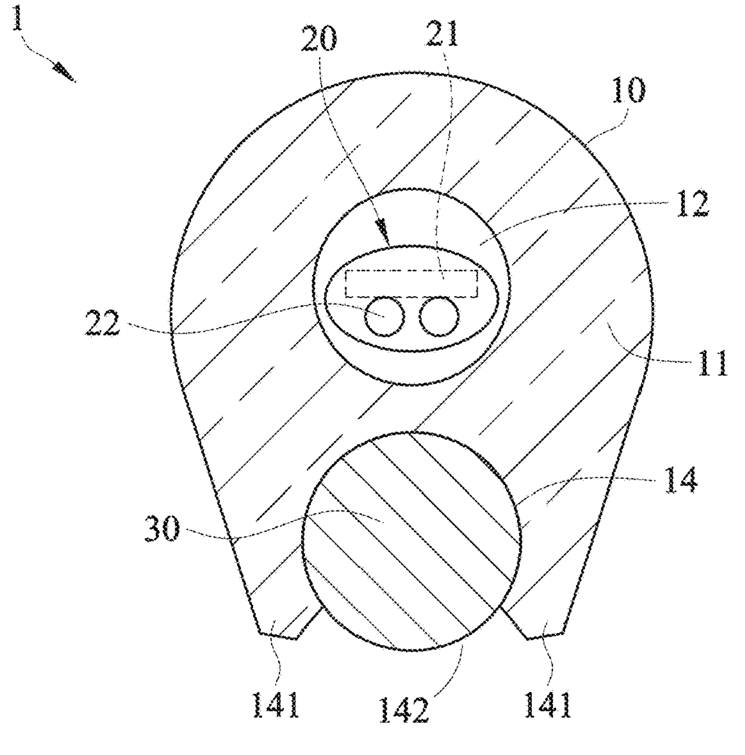
FIG. 3 is a cross sectional structural view of FIG. 1.

Please refer to FIG. 1 to FIG. 3, a light strip 1 of a basic structure of the present invention includes a flexible member 10 having a continuously extending elongated shape and a light emitting assembly 20 arranged at the internal of the flexible member 10.

In such a basic structure, the flexible member 10 is formed by a light transmissive portion 11. The light transmissive portion 11 is made of a light transmissive and flexible material, such as a silicone material that is transparent and colorless or is semi-transparent with a color, in order to form a flexible silicone strip/belt with elasticity and recovery capability. The internal of the light transmissive portion 11 includes a cavity 12, and the cavity 12 has an elongated shape extending along the extension direction of the flexible member 10. In addition, the flexible member 10 includes a slot 14 formed at one side thereof. The slot 14 is formed between two protrusions 141 with recovery elasticity and is used for clamping securement to a metal wire 30. The opening 142 of the slot 14 is formed at one side of the slot 14 that is located away from the cavity 12.

The slot 14, the two protrusions 141 and the opening 142 extend along the extension direction of the flexible member 10. FIG. 2 and FIG. 3 show projections of the entire light strip 1 in the extension direction, or cross sectional views of the light strip 1. The slot 14 is of a generally circular arc shape, with the cut-out portion of the slot 14 being the opening 142, and the width of the opening 142 is between the radius and the diameter of the slot 14. Preferably, the opening 142 corresponds to a central angle of 60~100 degrees. With the recovery elasticity of the flexible member 10, the slot 14 enables easy and firm clamping securement to the metal wire 30 during installation so that the light strip 1 will not come off easily.

The light emitting assembly 20 includes a plurality of light emitting elements 21 arranged at intervals inside the cavity 12 and a conductor for connecting the light emitting elements 21. The light emitting elements 21 mainly refer to small-size LED modules. In this embodiment, the conductor is a flexible conductive wire 22, and the conductive wire 22 penetrates the cavity 12 along the extension direction of the flexible member 10.

Figure 4:
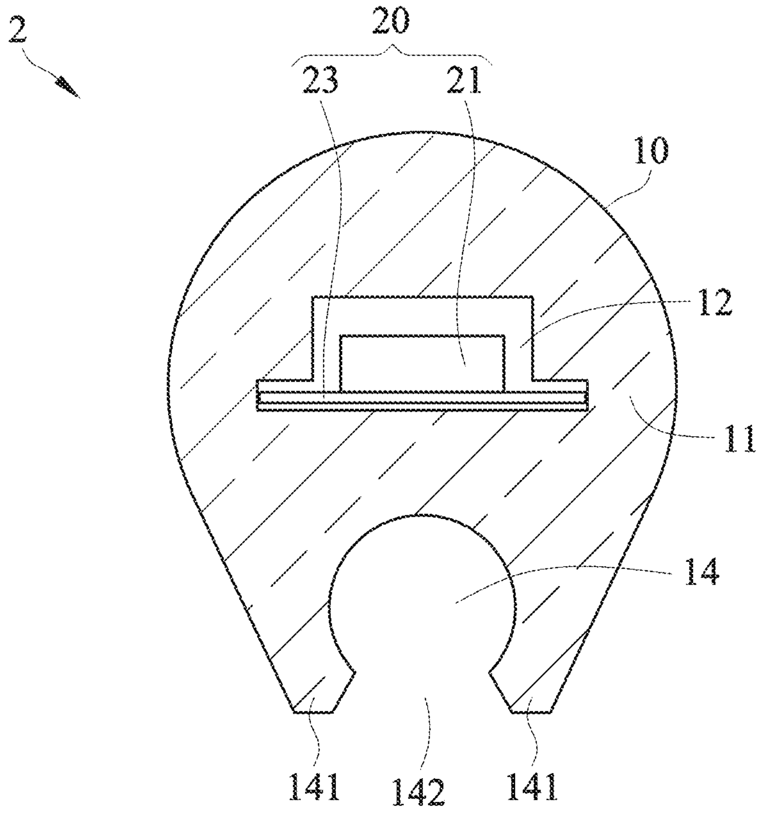
FIG. 4 is a cross sectional structural view of another basic light strip of the present invention.

Please refer to FIG. 4, which shows the structure of another basic light strip 2 of the present invention. The light strip 2 includes the same parts as those of the light strip 1, namely the flexible member 10, the light transmissive portion 11 and the slot 14 (with the two protrusions 141 and the opening 142). The main difference between the two light strips is that the light emitting assembly 20 of the light strip 2 uses a flexible conductive board 23 to connect the light emitting elements 21, wherein the conductive board 23 penetrates the cavity 12 along the extension direction of the flexible member 10. In addition, the cavity 12 formed in the light transmissive portion 11 has an appropriate shape matching the light emitting assembly 20.

In feasible embodiments of the present invention, the flexible conductive wire 22 or the conductive board 23 may be freely selected for use as the conductor of the light emitting assembly 20 in order to connect the light emitting elements 21 in such a way that the light emitting elements 21 are arranged at intervals. Either one is able to achieve the effect of cooperating with the flexible movement of the flexible member 10. In the embodiments described below, only a single type of conductor will be used for illustration; however, it shall be understood that the present invention is not limited to this single mode of implementation.

In the preceding two embodiments, the light emitted from the light emitting assembly 20 at the center is able to scatter out through the light transmissive portion 11, thereby achieving the effect of natural light output in directions other than that blocked by the conductive board 23 and the metal wire 30 (both of which block the same direction).

Figure 5:
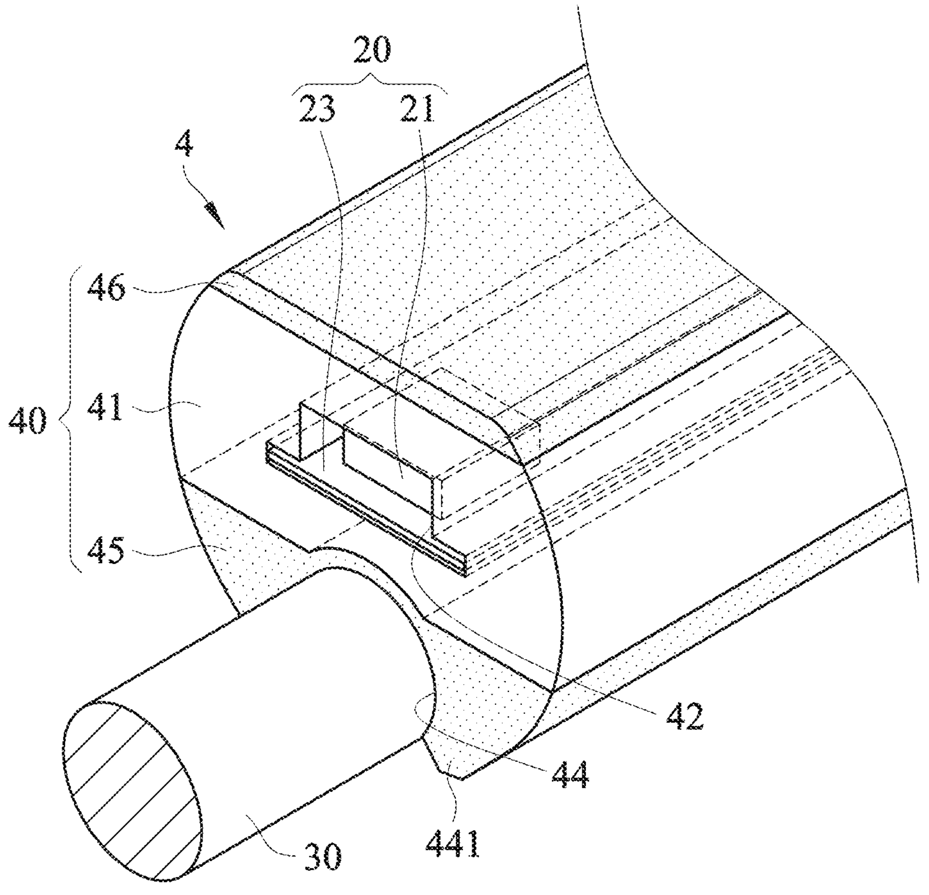
FIG. 5 is a perspective view of a variant light strip of the present invention, showing clamping securement of the light strip to a metal wire.
Figure 6:
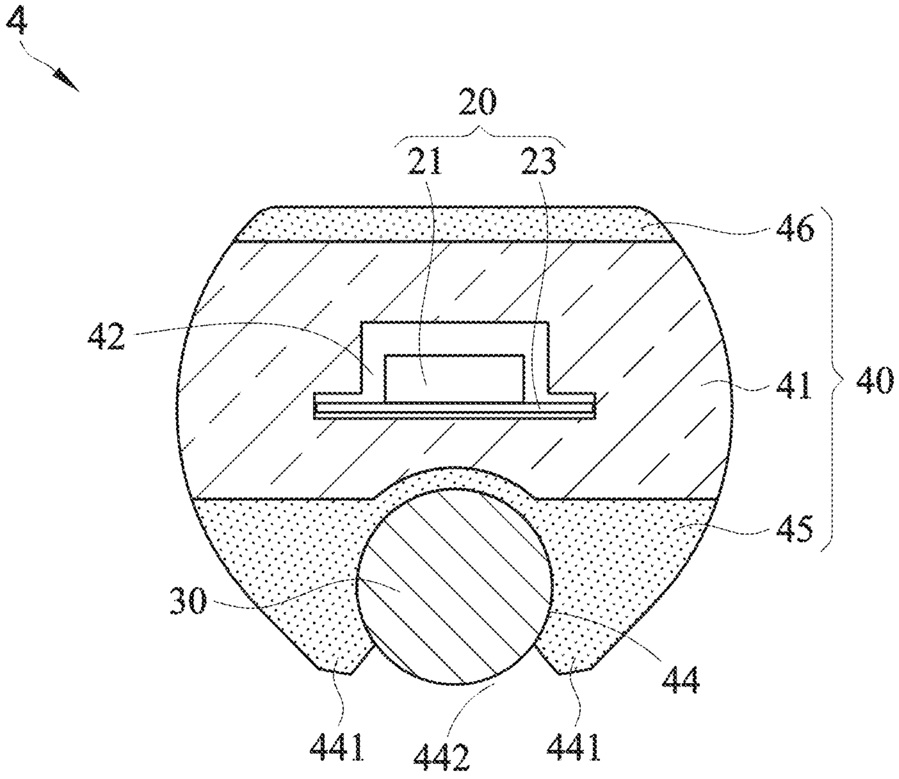
FIG. 6 is a cross sectional structural view of FIG. 5.

Please refer to FIG. 5 and FIG. 6, which show the structure of a variant light strip 4 of the present invention. This variant of the present invention mainly involves modifications in light output and light shielding so that the light strip 4 can produce a diversity of lighting effects to meet the requirements of various unique designs.

The light strip 4 includes a flexible member 40 having a continuously extending elongated shape and a light emitting assembly 20 arranged inside the flexible member 40. In this variant structure, the flexible member 40 is formed by a light transmissive portion 41, a first light shielding portion 45 and a second light shielding portion 46, and all these three parts extend along the extension direction of the flexible member 40. The first light shielding portion 45 and the second light shielding portion 46 are attached to two opposite sides, namely a lower outer side and an upper outer side, of the light transmissive portion 41, in order to shield or block light from the corresponding directions. Like its counterparts in the previous embodiments, the light transmissive portion 41 is made of a light transmissive and flexible material, such as a silicone material that is transparent and colorless or is semi-transparent with a color. The first light shielding portion 45 and the second light shielding portion 46 are made of an opaque flexible silicone material, allowing the flexible member 40 as a whole to form a flexible silicone strip/belt with elasticity and recovery capabilities.

The internal of the light transmissive portion 41 includes a cavity 42, and the cavity 42 has an elongated shape extending along the extension direction of the flexible member 40. The light emitting assembly 20 is arranged inside the cavity 42 and includes a plurality of light emitting elements 21 arranged at intervals and a conductor for connecting the light emitting elements 21. The light emitting elements 21 are the same as those in the previous embodiments, i.e., small-size LED modules. The conductor is a flexible conductor board 23, and the conductor board 23 penetrates the cavity 42 along the extension direction of the flexible member 40.

The flexible member 40 includes a slot 44 arranged at the first light shielding portion 45 and located away from the cavity 42. The slot 44 is formed between two protrusions 441 with recovery elasticity and is used to enable clamping securement to a metal wire 30. The opening 442 of the slot 44 is formed at one side of the slot 44 that is located away from the cavity 42. In addition, the slot 44, the two protrusions 441 and the opening 442 extend along the extension direction of the flexible member 40. The inner side of the slot 44 (or the corresponding portion of an extension projection or cross section of the slot 44) is of a circular arc shape, with the cut-out portion of the slot 44 being the opening 442. The width of the opening 442 is between the radius and the diameter of the slot 44, and the opening 442 preferably corresponds to a central angle of 60~100 degrees. Accordingly, with the recovery elasticity of the material, effortless installation and stable clamping securement can be achieved to prevent the light strip 4 from coming off easily.

In this embodiment, the upper and lower sides of the light transmissive portion 41 are shielded by the second and first light shielding portions 46, 45 respectively, while the exposed left and right sides of the light transmissive portion 41 form the light output portions, allowing the light emitted from the light emitting assembly 20 at the center to exit in a concentrated manner via the light output portions at the left and right sides, thereby producing a lighting effect different from those of the previous two embodiments, in which light is scattered freely.

Figure 7:
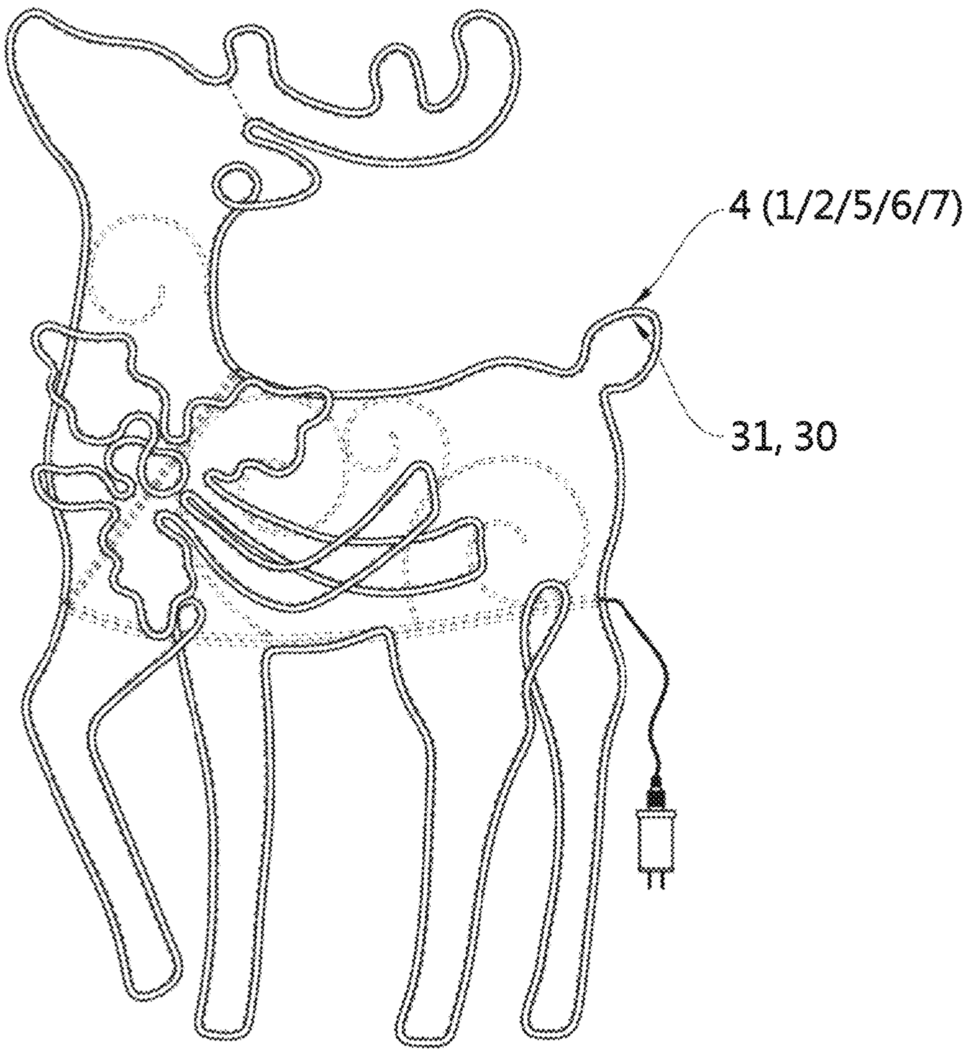
FIG. 7 is a schematic view of a shaped light ornament to which the present invention is applied.
Figure 8:
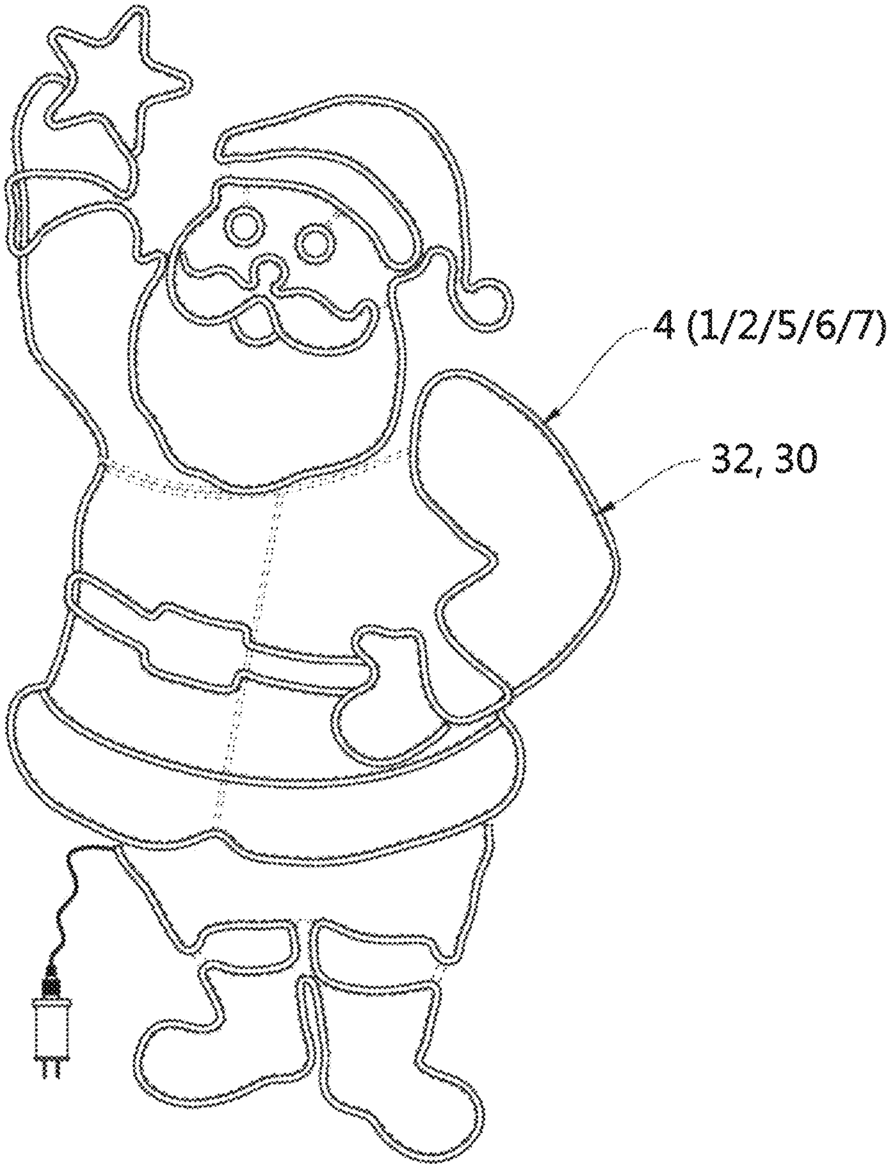
FIG. 8 is a schematic view of another shaped light ornament to which the present invention is applied.

In actual applications of the present invention as shown in FIG. 7 and FIG. 8, the slot 44 of the light strip 4 can be used to attach and secure the light strip 4 to the metal wire 30 of a predefined stand and thereby complete the installation easily to form various uniquely shaped light ornaments. It should be pointed out that the light strip used in such a shaped light ornament is not limited to the light strip 4 illustrated in this embodiment and may alternatively be any one of the light strips 1, 2, 5, 6 and 7 described above or below, with the stand made of at least one flexibly shapable metal wire 30. More specifically, automated processing can be used to bend and wind the metal wire 30 in order to form stands of various shapes, such as a first stand 31 having the shape of a reindeer (as shown in FIG. 7) and a second stand 32 having the shape of Santa Claus (as shown in FIG. 8). The light strip 4 (1/2/5/6/7) can be easily and stably secured and installed on the stand in a clamping manner along the contour of the stand, in order to form a planar or three-dimensional shaped light ornament. Furthermore, during the installation process, an adhesive dispensing operation can be performed while the light strip 4 (1/2/5/6/7) is secured to the metal wire 30 in a clamping manner, in order to produce an even firmer securing effect, thereby preventing the light strip from coming off due to external impact.

Figure 9:
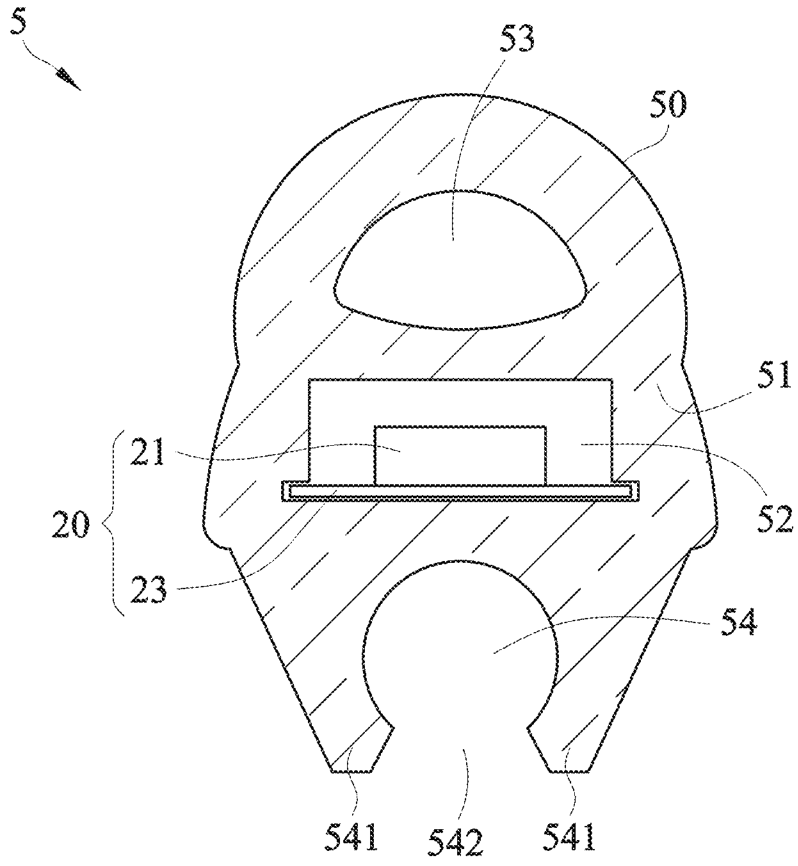
FIG. 9 is a cross sectional structural view of another variant light strip of the present invention.

Please refer to FIG. 9, which shows the structure of another variant light strip 5 of the present invention. The light strip 5 includes a flexible member 50 having a continuously extending elongated shape and a light emitting assembly 20 arranged inside the flexible member 50. In this embodiment, the flexible member 50 is formed by a light transmissive portion 51. Like its counterparts in the previous embodiments, the light transmissive portion 51 is made of a light transmissive and flexible material, such as a silicone material that is transparent and colorless or is semi-transparent with a color, allowing the flexible member 50 as a whole to form a flexible silicone strip/belt with elasticity and recovery capabilities.

The internal of the light transmissive portion 51 includes a cavity 52, and the cavity 52 has an elongated shape extending along the extension direction of the flexible member 50. The light emitting assembly 20 is arranged inside the cavity 52 and includes a plurality of light emitting elements 21 arranged at intervals and a conductor for connecting the light emitting elements 21. The light emitting elements 21 are the same as those in the previous embodiments, i.e., small-size LED modules. The conductor is a flexible conductor board 23, and the conductor board 23 penetrates the cavity 52 along the extension direction of the flexible member 50.

The flexible member 50 includes a slot 54 formed at one side thereof. The slot 54 is formed between two protrusions 541 with recovery elasticity and is used to enable clamping securement to a metal wire 30. The opening 542 of the slot 54 is formed at one side of the slot 54 that is located away from the cavity 52. The slot 54, the two protrusions 541 and the opening 542 extend along the extension direction of the flexible member 50. The inner side of the slot 54 (or the corresponding portion of an extension projection or cross section of the slot 54) is of a circular arc shape, with the cut-out portion of the slot 54 being the opening 542. The width of the opening 542 is between the radius and the diameter of the slot 54, and the opening 542 preferably corresponds to a central angle of 60~100 degrees. Accordingly, with the recovery elasticity of the material, effortless installation and stable clamping securement can be achieved to prevent the light strip 5 from coming off easily.

In this embodiment, the flexible member 50 further includes a hollow channel 53 arranged at the light transmissive portion 51, and the hollow channel 53 and the slot 54 are located on opposite sides of the cavity 52. The hollow channel 53 serves mainly to assist light diffusion and produce an enhanced buffering effect, the objective being to diffuse the light passing through the hollow channel 53 so that the light strip 5 as a whole has a gentle lighting effect, and to provide buffer and resistance against external impact so that the light emitting assembly 20 inside the light strip 5 is well protected.

In this embodiment, the light strip 5 is not provided with a light shielding portion for blocking light, so light can be scattered out freely through the light transmissive portion 51 (except in the direction blocked by the conductive board 23 and the metal wire 30). Moreover, light diffusion and hence a gentle lighting effect can be achieved in the direction where the hollow channel 53 is provided. As a result, the lighting effect of the light strip 5 is such that gentle light can be seen at the center of the light strip 5 while relatively strong light, or light spots, can be seen on the two lateral sides of the light strip 5.

Figure 10:
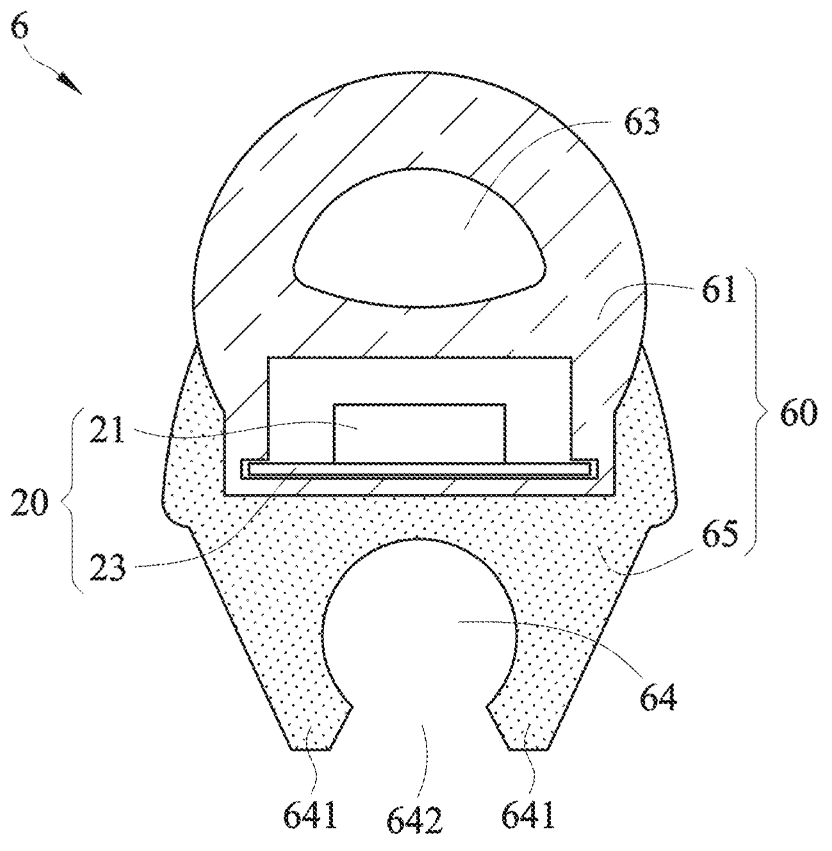
FIG. 10 is a cross sectional structural view of still another variant light strip of the present invention.

Please refer to FIG. 10, which shows the structure of yet another variant light strip 6 of the present invention. The light strip 6 includes a flexible member 60 having a continuously extending elongated shape and a light emitting assembly 20 arranged inside the flexible member 60. In this embodiment, the flexible member 60 is formed by a light transmissive portion 61 and a first light shielding portion 65, both extending along the extension direction of the flexible member 60. The first light shielding portion 65 is attached to an outer side of the light transmissive portion 61 in order to shield or block light from the corresponding direction. Like its counterparts in the previous embodiments, the light transmissive portion 61 is made of a light transmissive and flexible material, such as a silicone material that is transparent and colorless or is semi-transparent with a color, and the first light shielding portion 65 is made of an opaque flexible silicone material, allowing the flexible member 60 as a whole to form a flexible silicone strip/belt with elasticity and recovery capabilities.

The internal of the light transmissive portion 61 includes a cavity 62, and the cavity 62 has an elongated shape extending along the extension direction of the flexible member 60. The light emitting assembly 20 is arranged inside the cavity 62 and includes a plurality of light emitting elements 21 arranged at intervals and a conductor for connecting the light emitting elements 21. The light emitting elements 21 are the same as those in the previous embodiments, i.e., small-size LED modules. The conductor is a flexible conductor board 23, and the conductor board 23 penetrates the cavity 62 along the extension direction of the flexible member 60.

The flexible member 60 includes a slot 64 formed at one side of the first light shielding portion 65 that is located away from the cavity 62. The slot 64 is formed between two protrusions 641 with recovery elasticity and is used to enable clamping securement to a metal wire 30. The opening 642 of the slot 64 is formed at one side of the slot 64 that is located away from the cavity 62. The slot 64, the two protrusions 641 and the opening 642 extend along the extension direction of the flexible member 60. The inner side of the slot 64 (or the corresponding portion of an extension projection or cross section of the slot 64) is of a circular arc shape, with the cut-out portion of the slot 64 being the opening 642. The width of the opening 642 is between the radius and the diameter of the slot 64, and the opening preferably corresponds to a central angle of 60~100 degrees. Accordingly, with the recovery elasticity of the material, effortless installation and stable clamping securement can be achieved to prevent the light strip 6 from coming off easily.

In this embodiment, the flexible member 60 is similar to its counterpart in the previous embodiment in that it further includes a hollow channel 63 arranged at the light transmissive portion 61, and the hollow channel 63 and the slot 64 are located on opposite sides of the cavity 62. The hollow channel 63 serves mainly to assist light diffusion and produce an enhanced buffering effect, the objective being to diffuse the light passing through the hollow channel 63 so that the light strip 6 as a whole has a gentle lighting effect, and to provide buffer and resistance against external impact so that the light emitting assembly 20 inside the light strip 6 is well protected.

In this embodiment, the side of the light strip 6 that corresponds to the metal wire 30 is shield by the first light shielding portion 65, and the light emitting assembly 20 is slightly sunken into the first light shielding portion 65 such that most of the light passes through the hollow channel 63 in a concentrated manner. This allows the light strip 6 as a whole to produce a uniform and gentle lighting effect.

Figure 11:
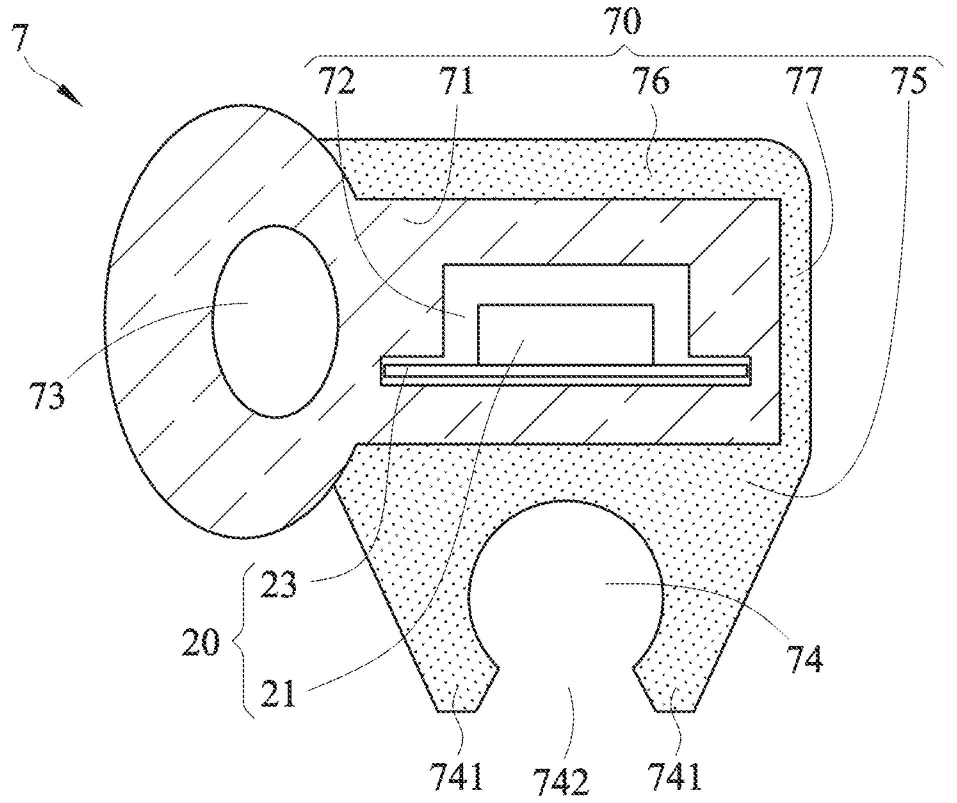
FIG. 11 is a cross sectional structural view of yet another variant light strip of the present invention.

Please refer to FIG. 11, which shows the structure of still another variant light strip 7 of the present invention. The light strip 7 includes a flexible member 70 having a continuously extending elongated shape and a light emitting assembly 20 arranged inside the flexible member 70. In this variant structure, the flexible member 70 is formed by a light transmissive portion 71, a first light shielding portion 75, a second light shielding portion 76 and a third light shielding portion 77, and all these four parts extend along the extension direction of the flexible member 70. The first light shielding portion 75 and the second light shielding portion 76 are attached to two opposite sides, namely a lower outer side and an upper outer side, of the light transmissive portion 71. The third light shielding portion 77 is attached to an outer side of the light transmissive portion 71 that is adjacent to the first light shielding portion 75, and the third light shielding portion 77 is connected to the first light shielding portion 75 and the second light shielding portion 76 separately. The three light shielding portions are used to shield or block light from the corresponding directions. Like its counterparts in the previous embodiments, the light transmissive portion 71 is made of a light transmissive and flexible material, such as a silicone material that is transparent and colorless or is semi-transparent with a color. The first light shielding portion 75, the second light shielding portion 76 and the third light shielding portion 77 are made of an opaque flexible silicone material, allowing the flexible member 70 as a whole to form a flexible silicone strip/belt equipped with elasticity and recovery capabilities.

The internal of the light transmissive portion 71 includes a cavity 72, and the cavity 72 has an elongated shape extending along the extension direction of the flexible member 70. The light emitting assembly 20 is arranged inside the cavity 72 and includes a plurality of light emitting elements 21 arranged at intervals and a conductor for connecting the light emitting elements 21. The light emitting elements 21 are the same as those in the previous embodiment, i.e., small-size LED modules. The conductor is a flexible conductor board 23, and the conductor board 23 penetrates the cavity 72 along the extension direction of the flexible member 70.

The flexible member 70 includes a slot 74 formed at one side of the first light shielding portion 75 that is located away from the cavity 72. The slot 74 is formed between two protrusions 741 with recovery elasticity and is used to enable clamping securement to a metal wire 30. The opening 742 of the slot 74 is formed at one side of the slot 74 that is located away from the cavity 72. The slot 74, the two protrusions 741 and the opening 742 extend along the extension direction of the flexible member 70. The inner side of the slot 74 (or the corresponding portion of an extension projection or cross section of the slot 74) is of a circular arc shape, with the cut-out portion of the slot 74 being the opening 742. The width of the opening 742 is between the radius and the diameter of the slot 74, and the opening 742 preferably corresponds to a central angle of 60~100 degrees. Accordingly, with the recovery elasticity of the material, effortless installation and stable clamping securement can be achieved to prevent the light strip 7 from coming off easily.

In this embodiment, the light strip 7 is blocked in three directions each by one of the first, second and third light shielding portions 75, 76, 77 such that the light emitted from the light emitting assembly 20 is output in a concentrated manner from the one side that is not blocked. Accordingly, with the hollow channel 73 arranged at this side, the light strip 7 is able to produce a uniform and gentle lighting effect at one side.

Figure 12:
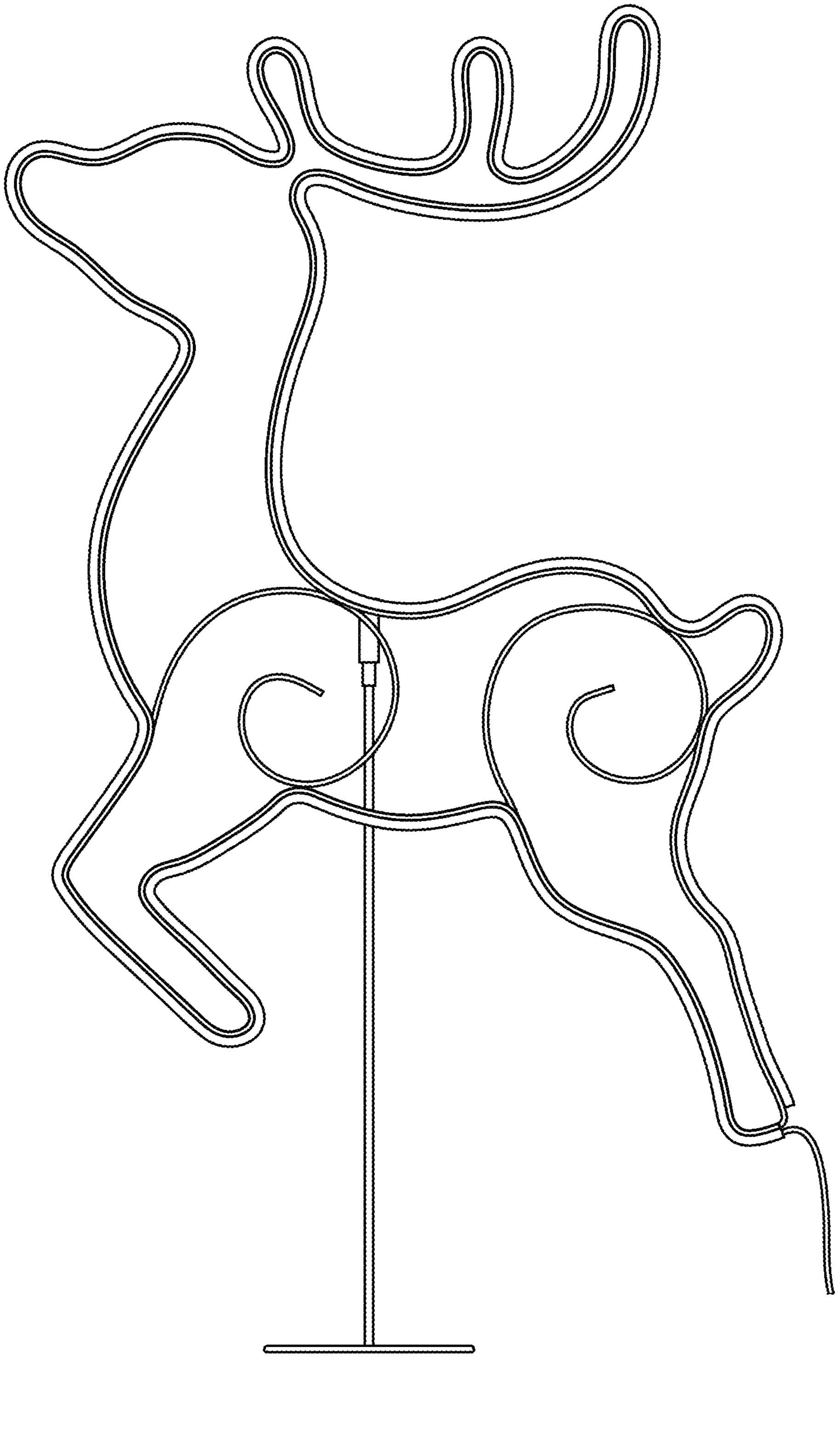
FIG. 12 shows the lighting effect of an actual object, or more particularly of a light ornament composed of the light strip according to the embodiment shown in FIG. 5.
Figure 13:
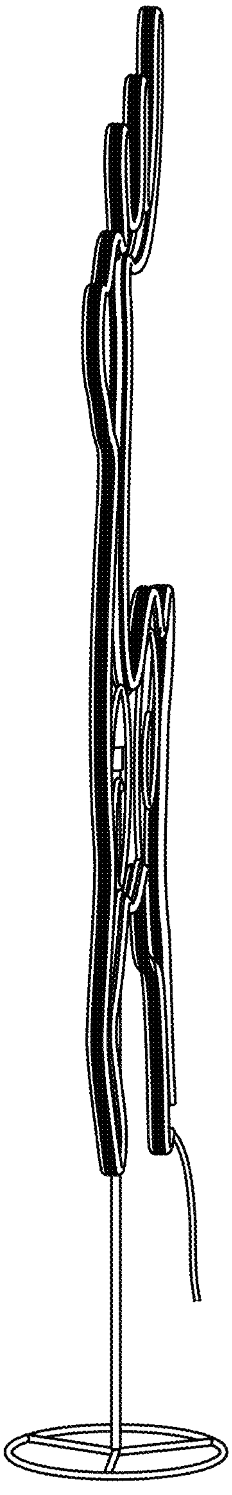
FIG. 13 shows the lighting effect of the light ornament in FIG. 12 as seen from the side.

During actual use, the inventor found that failure to properly match the light scattering effect of the light transmissive portion with the light intensity of the LED modules is very likely to result in the formation of alternate bright and dark spots on the outer side of the light strip such that the beautiful visual effect expected to be seen when the light strip emits light as a whole is compromised. This led to the design of the embodiment in FIG. 5, in which a light shielding portion is provided on a side corresponding to a light emitting direction of the LED modules (i.e., with the second light shielding portion 46 provided on the upper outer side of the light transmissive portion 41 and corresponding to the light emitting elements 21) to prevent uneven brightness on the outer side and to make a beautiful light ornament with light emitting from two lateral sides of the light strip. The actual lighting effect of such a light ornament is shown in FIG. 12 and FIG. 13. As shown in FIG. 12, the contour of the entire pattern of the light ornament can be seen in front view, and yet the shielding effect of the second light shielding portion 46 causes no light emission from the outer side of the light strip 4 and hence no light on the lateral sides of the light ornament (see FIG. 13). As a result, the light ornament is kept from producing a three-dimensional lighting effect and therefore cannot show its beauty as a whole.

In view of the above, the inventor improved the designs of the foregoing embodiments where the conductive board 23 is used, and came up with the embodiments shown in FIG. 14-15, FIG. 18, FIG. 19 and FIG. 20.

Figure 14:
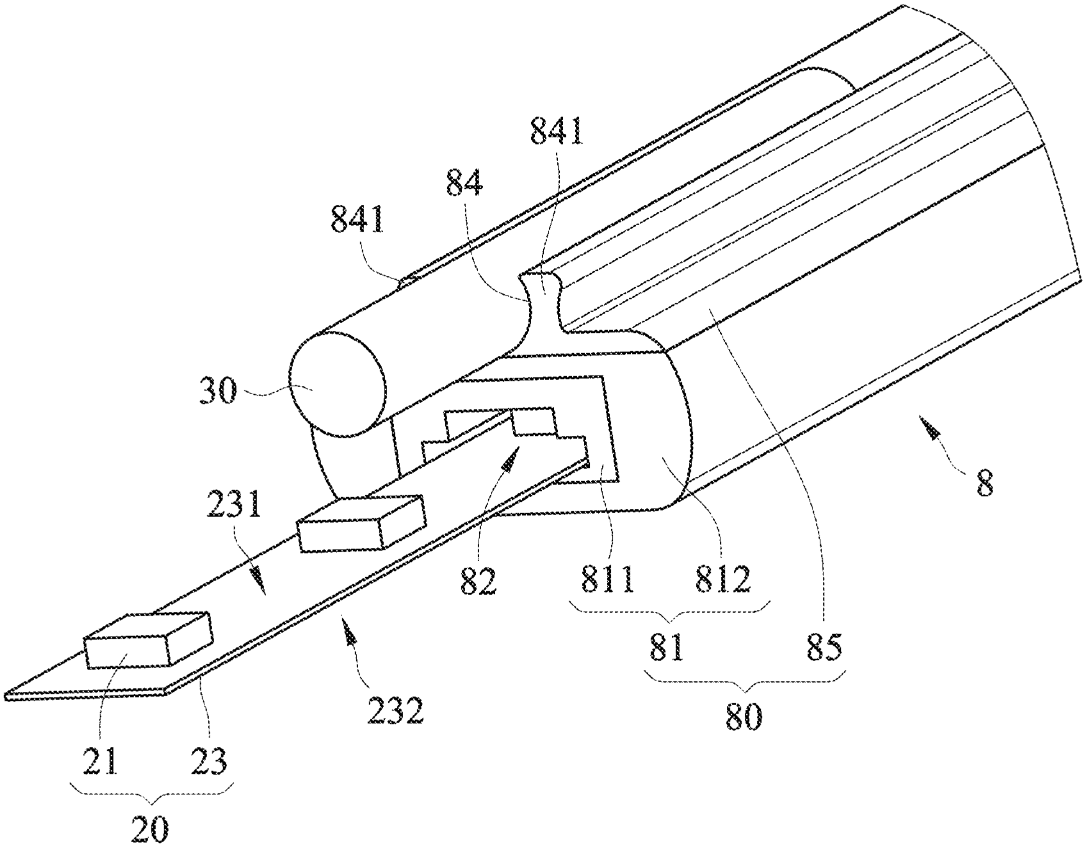
FIG. 14 is a perspective view of a light strip according to the present invention whose lighting effect is improved and that is secured to a metal wire in a clamping manner.
Figure 15:
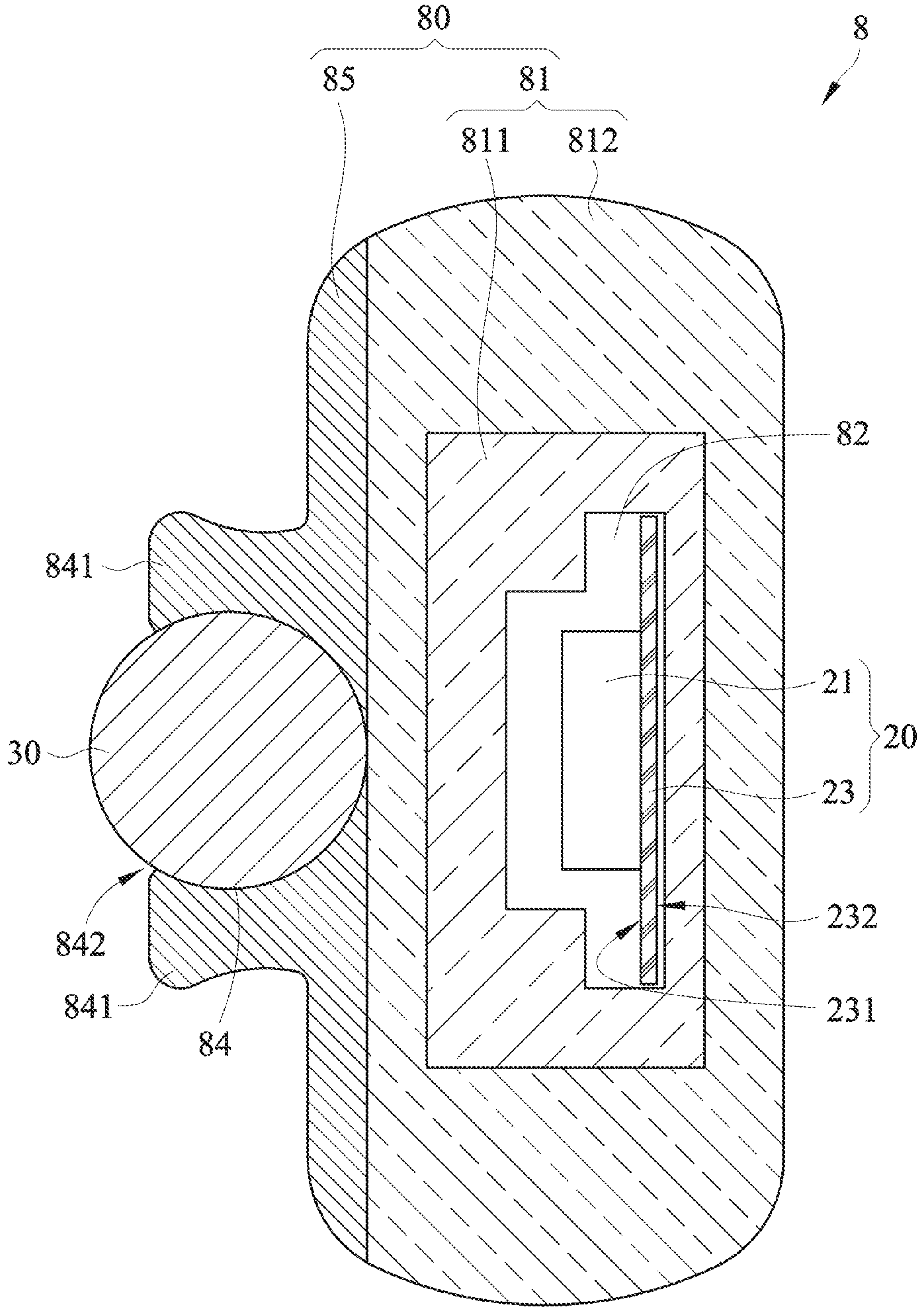
FIG. 15 is a cross sectional structural view of FIG. 14.

Referring to FIG. 14 and FIG. 15, the structure of this light strip 8 having an improved lighting effect includes a flexible member 80 having a continuously extending elongated shape and a light emitting assembly 20 provided in the flexible member 80. The flexible member 80 is formed by a light transmissive portion 81 and a first light shielding portion 85, both extending along the extension direction of the flexible member 80. The light transmissive portion 81 includes an inner layer 811 and an outer layer 812, both made of a light transmissive and flexible material such as a silicone material that is transparent and colorless or is semi-transparent with a color. The outer layer 812 has lower transmittance than the inner layer 811. The inner layer 811 has relatively high transmittance in order to allow a relatively large amount of light to penetrate the inner layer 811 and enter the outer layer 812. The outer layer 812 has relatively low transmittance in order to produce a relatively significant light-softening effect and thereby prevent the generation of glaring light. The first light shielding portion 85 is made of an opaque flexible silicone material to allow the flexible member 80 as a whole to form a flexible silicone strip/belt with elasticity and recovery capabilities.

The inner layer 811 of the light transmissive portion 81 includes a cavity 82, and the cavity 82 has an elongated shape extending in the extension direction of the flexible member 80. The light emitting assembly 20 is arranged inside the cavity 82 and includes a plurality of light emitting elements 21 that are arranged at intervals and a conductor that connects the light emitting elements 21. The light emitting elements 21 are small-size LED modules. The conductor is a flexible conductive board 23, and the conductive board 23 penetrates the cavity 82 along the extension direction of the flexible member 80.

In this embodiment, the inner side of the flexible member 80 is defined as the side where the first shielding portion 85 is provided, and the opposite side of the flexible member 80, i.e., a side located away from the first light shielding portion 85, is defined as the outer side. A slot 84 is provided in the inner side, or more particularly in the first light shielding portion 85. The slot 84 is formed between two protrusions 841 with recovery elasticity and is configured to enable clamping securement to a continuously extending elongated carrier (e.g., a metal wire 30). The opening 842 of the slot 84 is formed at a side of the slot 84 that is located away from the cavity 82. The slot 84, the two protrusions 841 and the opening 842 extend along the extension direction of the flexible member 80. The inner side of the slot 84 (or the corresponding portion of an extension projection or cross section of the slot 84) is of a generally circular arc shape, with the cut-out portion of the slot 84 being the opening 842. The width of the opening 842 is between the radius and diameter of the slot 84. Preferably, the width corresponds to a central angle of 60~100 degrees so that, thanks to the recovery elasticity of the material, ease of installation can be achieved together with stable clamping securement without disengagement.

Figure 16:
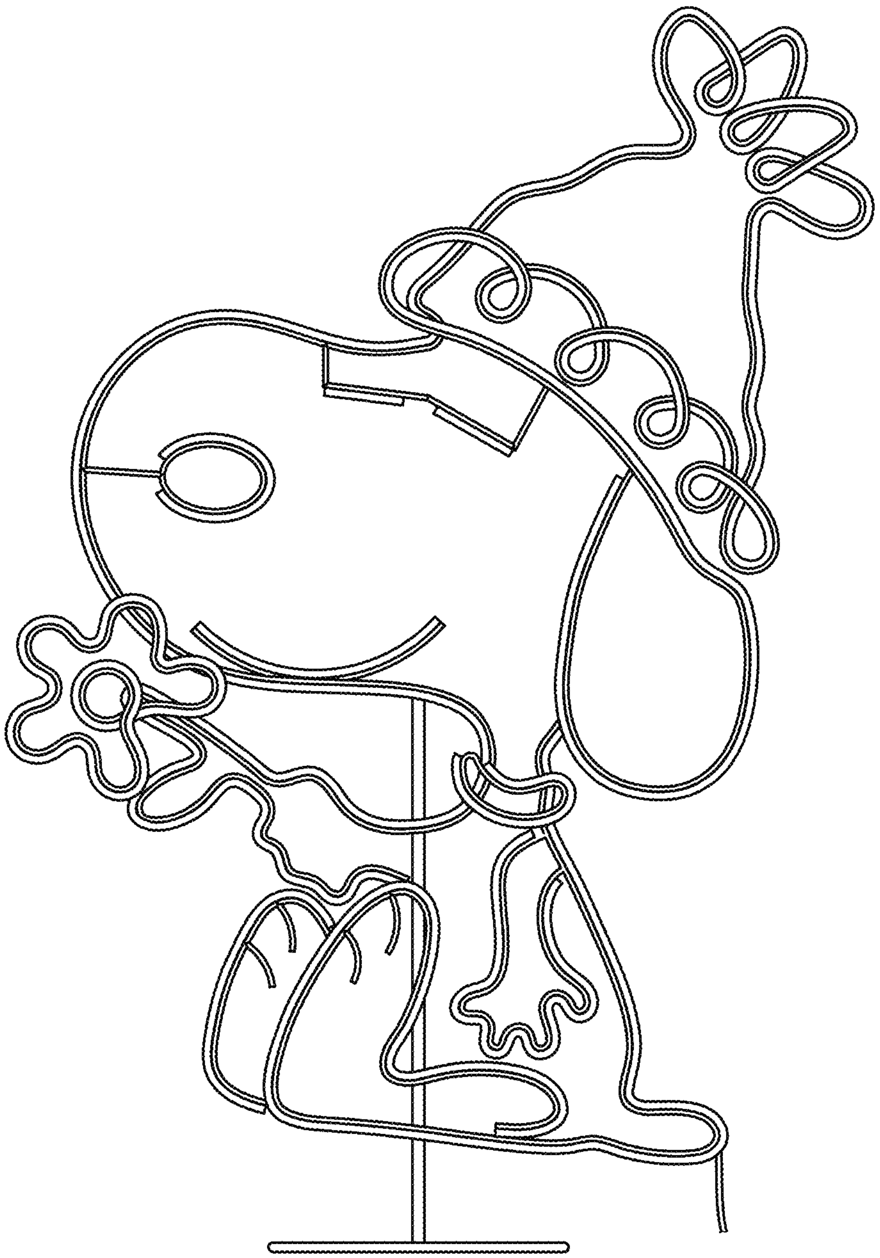
FIG. 16 shows the lighting effect of an actual object, or more particularly of a light ornament composed of the light strip according to the embodiment shown in FIG. 14.
Figure 17:
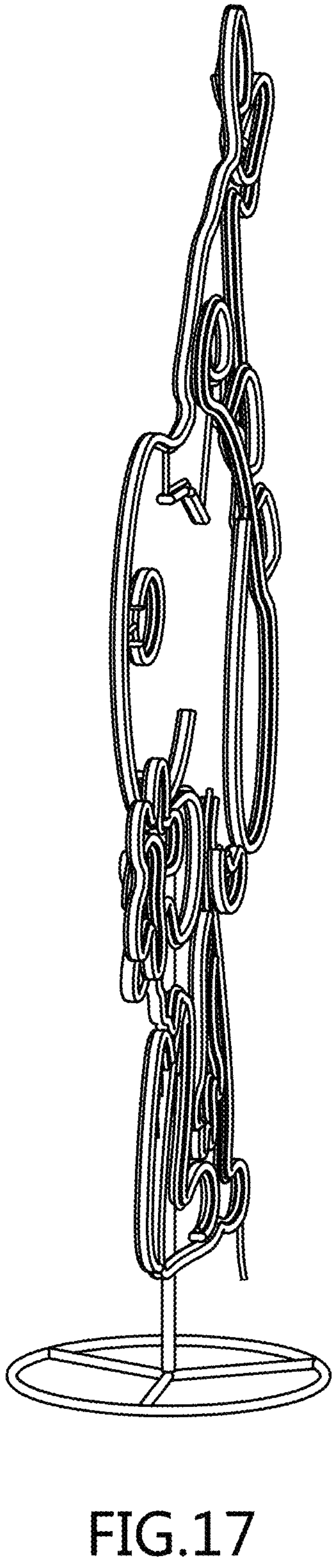
FIG. 17 shows the lighting effect of the light ornament in FIG. 16 as seen from the side.

Moreover, the side of the conductive board 23 that is attached with the light emitting elements 21 is defined as the first side 231, and the side of the conductive board 23 that is not provided with any light source is defined as the second side 232. In this embodiment, the light emitting assembly 20 is disposed in such a way that the first side 231 faces the inner side while the second side faces the outer side. FIG. 16 and FIG. 17 show the lighting effect of an actual object formed by securing this embodiment to the metal wire 30 of a stand portion in a clamping manner. The conductive board 23 shields the LED modules and thereby prevents bright spots, or uneven brightness, from forming on the outer side. Meanwhile, the light transmissive portion 81, which surrounds the light emitting assembly 20, has a light scattering effect and therefore will not cause a total lack of light emission from the outer side (see FIG. 17, which shows an improved lighting effect, in comparison with FIG. 13, which lacks the improved lighting effect). The foregoing design allows the light strip 8, and hence a light ornament composed thereof, to have a beautiful lighting effect visible from different viewing angles and thus produce a three-dimensional effect.

In this embodiment, the projection of the inner layer 811 in the extension direction has a rectangular shape to facilitate forming, and the outer layer 812 is a matte layer for providing a matte light-scattering effect. For example, the outer layer 812 is made of a silicone material whose light-entering surface and/or light-exiting surface has a light scattering effect in order for the light emitted through the light transmissive portion 81 as a whole to be relatively soft and even and thus provide enhanced visual comfort. Furthermore, the cavity 82 in the inner layer 811 has one side that corresponds to the light emitting elements 21 and that is provided with a recessed inner surface, or more particularly with a first light-entering surface corresponding to the front side of the light emitting elements 21 and two second light-entering surfaces each corresponding to one of two opposite lateral sides of the light emitting elements 21 such that the light emitting elements 21 are located among the light-entering surfaces. This allows more light to be projected into the light transmissive portion 81 toward the light-exiting surface.

Figure 18:
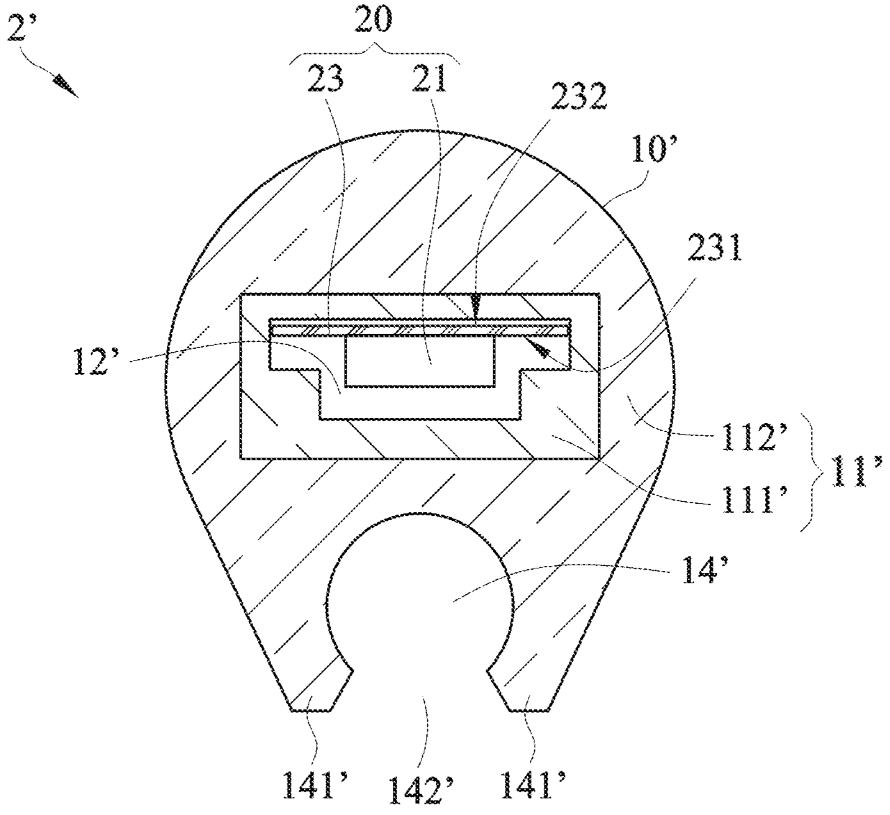
FIG. 18 is a cross sectional structural view of another light strip according to the present invention whose lighting effect is improved.

The same lighting effect improvement can be incorporated into other light strip structures as well. Referring to FIG. 18, the structure of this light strip 2' having an improved lighting effect includes a flexible member 10' having a continuously extending elongated shape and a light emitting assembly 20 provided in the flexible member 10'. The flexible member 10' is formed by a light transmissive portion 11'. The light transmissive portion 11' includes an inner layer 111' and an outer layer 112', the materials and properties of both of which are the same as those in the previous embodiment and therefore will not be stated repeatedly. The inner layer 111' of the light transmissive portion 11' includes a cavity 12', and the cavity 12' has an elongated shape extending in the extension direction of the flexible member 10'. A slot 14' is provided in one side of the flexible member 10'. The slot 14' is formed between two protrusions 141' with recovery elasticity and is configured to enable clamping securement to a metal wire 30. The opening 142' of the slot 14' is formed at a side of the slot 14' that is located away from the cavity 12'. The slot 14', the two protrusions 141' and the opening 142' extend along the extension direction of the flexible member 10' and have the same features as their respective counterparts in the previous embodiment; these features, therefore, will not be stated repeatedly. The light emitting assembly 20 includes a plurality of light emitting elements 21 that are arranged at intervals in the cavity 12' and a conductor that connects the light emitting elements 21. The light emitting elements 21 are small-size LED modules. The conductor is a flexible conductive board 23, and the conductive board 23 penetrates the cavity 12' along the extension direction of the flexible member 10'.

In this embodiment, the inner side of the flexible member 10' is defined as the side where the slot 14' is provided, and the opposite side of the flexible member 10', i.e., a side located away from the slot 14', is defined as the outer side. In addition, the side of the conductive board 23 that is attached with the light emitting elements 21 is defined as the first side 231, and the side of the conductive board 23 that is not provided with any light source is defined as the second side 232. The light emitting assembly 20 is disposed in such a way that the first side 231 faces the inner side of the flexible member 10' while the second side faces the outer side of the flexible member 10'. The conductive board 23, therefore, can shield the LED modules to prevent such unpleasant sights as bright spots and uneven brightness from forming on the outer side of the light strip 2', and hence on a light ornament composed of the light strip 2', and an improved lighting effect is thereby achieved.

Figure 19:
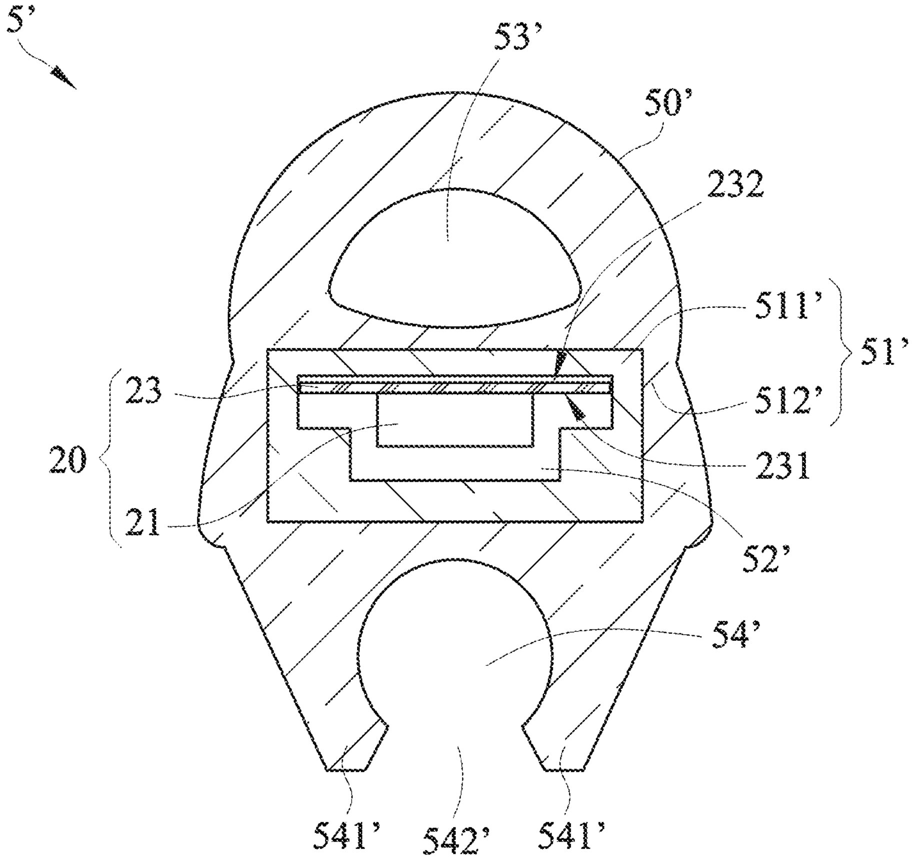
FIG. 19 is a cross sectional structural view of yet another light strip according to the present invention whose lighting effect is improved.

Referring to FIG. 19, the structure of this light strip 5' having an improved lighting effect includes a flexible member 50' having a continuously extending elongated shape and a light emitting assembly 20 provided in the flexible member 50'. The flexible member 50' is formed by a light transmissive portion 51'. The light transmissive portion 51' includes an inner layer 511' and an outer layer 512', the materials and properties of both of which are the same as those in the previous two embodiments and therefore will not be stated repeatedly. The inner layer 511' of the light transmissive portion 51' includes a cavity 52', and the cavity 52' has an elongated shape extending in the extension direction of the flexible member 50'. A slot 54' is provided in one side of the flexible member 50'. The slot 54' is formed between two protrusions 541' with recovery elasticity and is configured to enable clamping securement to a metal wire 30. The opening 542' of the slot 54' is formed at a side of the slot 54' that is located away from the cavity 52'. The slot 54', the two protrusions 541' and the opening 542' extend along the extension direction of the flexible member 50' and have the same features as their respective counterparts in the previous two embodiments; these features, therefore, will not be stated repeatedly. The light emitting assembly 20 includes a plurality of light emitting elements 21 that are arranged at intervals in the cavity 52' and a conductor that connects the light emitting elements 21. The light emitting elements 21 are small-size LED modules. The conductor is a flexible conductive board 23, and the conductive board 23 penetrates the cavity 52' along the extension direction of the flexible member 50'.

In this embodiment, the inner side of the flexible member 50' is defined as the side where the slot 54' is provided, and the opposite side of the flexible member 50', i.e., a side located away from the slot 54', is defined as the outer side. In addition, the side of the conductive board 23 that is attached with the light emitting elements 21 is defined as the first side 231, and the side of the conductive board 23 that is not provided with any light source is defined as the second side 232. The light emitting assembly 20 is disposed in such a way that the first side 231 faces the inner side of the flexible member 50' while the second side faces the outer side of the flexible member 50'. Moreover, a hollow channel 53' is provided in the outer layer 512' of the light transmissive portion 51', and the hollow channel 53' and the slot 54' are located on opposite sides of the cavity 52'. The conductive board 23, therefore, can shield the LED modules to prevent such unpleasant sights as bright spots and uneven brightness from forming on the outer side of the light strip 5', and hence on a light ornament composed of the light strip 5', and an improved lighting effect is thereby achieved. The hollow channel 53' provides an additional buffer that allows the light strip 5' as a whole to produce an even softer light emitting effect.

Figure 20:
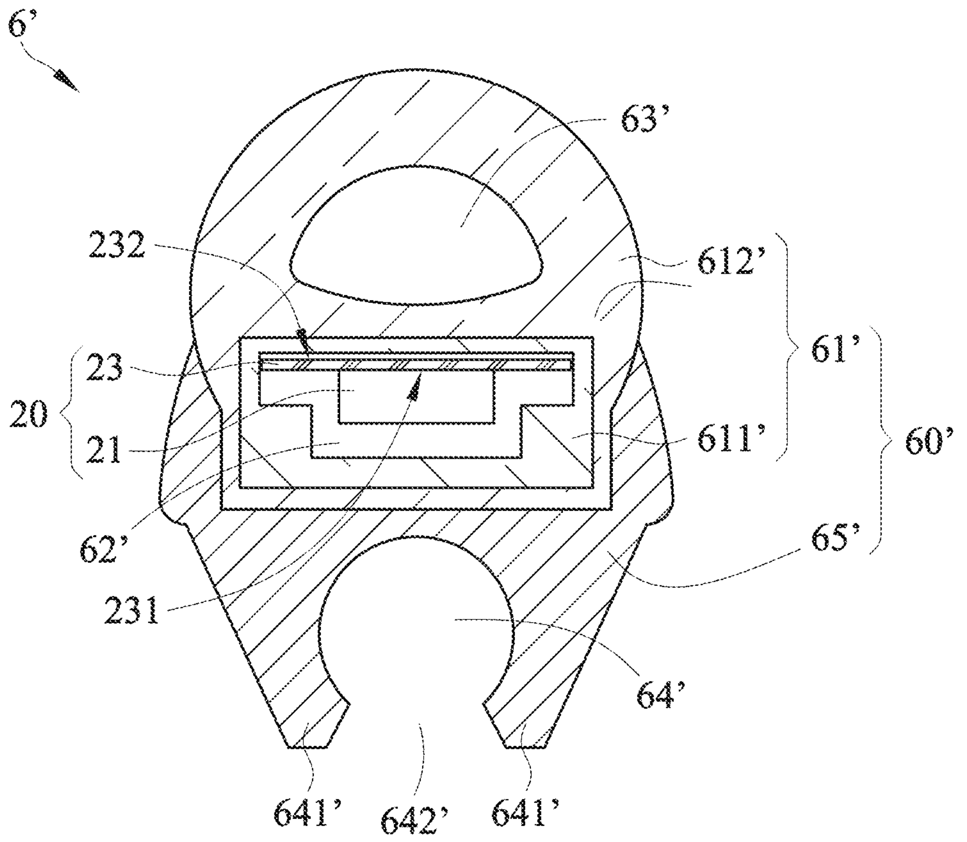
FIG. 20 is a cross sectional structural view of still another light strip according to the present invention whose lighting effect is improved.

Referring to FIG. 20, the structure of this light strip 6' having an improved lighting effect includes a flexible member 60' having a continuously extending elongated shape and a light emitting assembly 20 provided in the flexible member 60'. The flexible member 60' is formed by a light transmissive portion 61' and a first light shielding portion 65', both extending along the extension direction of the flexible member 60'. The light transmissive portion 61' includes an inner layer 611' and an outer layer 612'. The first light shielding portion 65' is attached to the side of the light transmissive portion 61' that is adjacent to the inner layer 611', in order to shield or block light coming from the corresponding directions. The materials and properties of the light transmissive portion 61' and the first light shielding portion 65' are the same as those in the previous embodiments and therefore will not be stated repeatedly. The inner layer 611' of the light transmissive portion 61' includes a cavity 62', and the cavity 62' has an elongated shape extending in the extension direction of the flexible member 60'. A slot 64' is provided in one side of the flexible member 60'. The slot 64' is formed between two protrusions 641' with recovery elasticity and is configured to enable clamping securement to a metal wire 30. The opening 642' of the slot 64' is formed at a side of the slot 64' that is located away from the cavity 62'. The slot 64', the two protrusions 641' and the opening 642' extend along the extension direction of the flexible member 60' and have the same features as their respective counterparts in the previous embodiments; these features, therefore, will not be stated repeatedly. The light emitting assembly 20 includes a plurality of light emitting elements 21 that are arranged at intervals in the cavity 62' and a conductor that connects the light emitting elements 21. The light emitting elements 21 are small-size LED modules. The conductor is a flexible conductive board 23, and the conductive board 23 penetrates the cavity 62' along the extension direction of the flexible member 60'.

In this embodiment, the inner side of the flexible member 60' is defined as the side where the slot 64' is provided, and the opposite side of the flexible member 60', i.e., a side located away from the slot 64', is defined as the outer side. In addition, the side of the conductive board 23 that is attached with the light emitting elements 21 is defined as the first side 231, and the side of the conductive board 23 that is not provided with any light source is defined as the second side 232. The light emitting assembly 20 is disposed in such a way that the first side 231 faces the inner side of the flexible member 60' while the second side faces the outer side of the flexible member 60'. Moreover, a hollow channel 63' is provided in the outer layer 612' of the light transmissive portion 61', and the hollow channel 63' and the slot 64' are located on opposite sides of the cavity 62'. The conductive board 23, therefore, can shield the LED modules to prevent such unpleasant sights as bright spots and uneven brightness from forming on the outer side of the light strip 6', and hence on a light ornament composed of the light strip 6', and an improved lighting effect is thereby achieved. The hollow channel 63' provides an additional buffer that allows the light strip 6' as a whole to produce an even softer light emitting effect.

The above description is provided to explain the preferred embodiments of the present invention only, and any extension, modification, mere change or equivalent replacement made according to the technical means of the present invention shall be considered to be within the claim scope of the present invention.

What is claimed is:

1. A light strip configured to facilitate shape forming, comprising:

a flexible member having a continuously extending elongated shape and comprising a light transmissive portion and a cavity formed inside the light transmissive portion, and the cavity extending along an extension direction of the flexible member; and a light emitting assembly comprising a plurality of light emitting elements arranged at intervals inside the cavity and a conductor connected to the light emitting elements, wherein the conductor is formed by a flexible conductive board and penetrates the cavity along the extension direction of the flexible member, and the light emitting elements are light-emitting diode (LED) modules attached to the conductive board;

wherein the flexible member further comprises a slot arranged at one side thereof and configured for clamping securement, the slot is formed between two protrusions with recovery elasticity, and an opening of the slot is formed at one side of the slot that is located away from the cavity; and the slot, the two protrusions and the opening extend along the extension direction of the flexible member to facilitate clamping securement to a continuously extending elongated carrier, thereby allowing the flexible member to be fixed to and shaped along the carrier;

wherein the flexible member is further formed with two opposite sides, one of the two opposite sides is an inner side provided with the slot, the other of the two opposite sides is an outer side facing away from the slot, the conductive board has a first side to which the light emitting elements are attached and a second side facing away from the first side, the first side faces the inner side, and the second side faces the outer side.

2. The light strip configured to facilitate shape forming according to claim 1, wherein a projection of the slot in the extension direction has an arc shape, a width of the opening of the slot is between a radius and a diameter of the slot, and the opening of the slot corresponds to a central angle between 60 and 100 degrees.

3. The light strip configured to facilitate shape forming according to claim 2, wherein the light transmissive portion of the flexible member comprises an inner layer and an outer layer, the cavity is provided in the inner layer, the outer layer is provided on an outer side of the inner layer, and the outer layer has lower transmittance than the inner layer.

4. The light strip configured to facilitate shape forming according to claim 3, wherein the flexible member further comprises a hollow channel arranged at the light transmissive portion, and the hollow channel and the slot are located at opposite sides of the cavity.

5. The light strip configured to facilitate shape forming according to claim 3, wherein the flexible member further comprises a first light shielding portion attached to one side of the light transmissive portion, and the slot is formed at the first light shielding portion.

6. The light strip configured to facilitate shape forming according to claim 5, wherein the flexible member further comprises a hollow channel arranged at the light transmissive portion, and the hollow channel and the slot are located at opposite sides of the cavity.

7. The light strip configured to facilitate shape forming according to claim 5, wherein the outer layer is a matte layer for providing a matte light-scattering effect.

8. The light strip configured to facilitate shape forming according to claim 7, wherein a projection of the inner layer in the extension direction has a rectangular shape.

9. The light strip configured to facilitate shape forming according to claim 8, wherein the conductive board is a conductive board allowing or not allowing passage of light.

10. The light strip configured to facilitate shape forming according to claim 1, wherein the light transmissive portion of the flexible member comprises an inner layer and an outer layer, the cavity is provided in the inner layer, the outer layer is provided on an outer side of the inner layer, and the outer layer has lower transmittance than the inner layer.

11. The light strip configured to facilitate shape forming according to claim 10, wherein the flexible member further comprises a hollow channel arranged at the light transmissive portion, and the hollow channel and the slot are located at opposite sides of the cavity.

12. The light strip configured to facilitate shape forming according to claim 10, wherein the flexible member further comprises a first light shielding portion attached to one side of the light transmissive portion, and the slot is formed at the first light shielding portion.

13. The light strip configured to facilitate shape forming according to claim 12, wherein the flexible member further comprises a hollow channel arranged at the light transmissive portion, and the hollow channel and the slot are located at opposite sides of the cavity.

14. The light strip configured to facilitate shape forming according to claim 12, wherein the outer layer is a matte layer for providing a matte light-scattering effect.

15. The light strip configured to facilitate shape forming according to claim 14, wherein a projection of the inner layer in the extension direction has a rectangular shape.

16. The light strip configured to facilitate shape forming according to claim 15, wherein the conductive board is a conductive board allowing or not allowing passage of light.

17. A shaped light ornament, comprising:

a light strip configured to facilitate shape forming, comprising:

a flexible member having a continuously extending elongated shape and comprising a light transmissive portion and a cavity formed inside the light transmissive portion, and the cavity extending along an extension direction of the flexible member; and a light emitting assembly comprising a plurality of light emitting elements arranged at intervals inside the cavity and a conductor connected to the light emitting elements, wherein the conductor is formed by a flexible conductive board and penetrates the cavity along the extension direction of the flexible member, and the light emitting elements are light-emitting diode (LED) modules attached to the conductive board;

wherein the flexible member further comprises a slot arranged at one side thereof and configured for clamping securement, the slot is formed between two protrusions with recovery elasticity, and an opening of the slot is formed at one side of the slot that is located away from the cavity; and the slot, the two protrusions and the opening extend along the extension direction of the flexible member to facilitate clamping securement to a continuously extending elongated carrier, thereby allowing the flexible member to be fixed to and shaped along the carrier;

wherein the flexible member is further formed with two opposite sides, one of the two opposite sides is an inner side provided with the slot, the other of the two opposite sides is an outer side facing away from the slot, the conductive board has a first side to which the light emitting elements are attached and a second side facing away from the first side, the first side faces the inner side, and the second side faces the outer side; and a stand portion formed by at least one flexibly shapable metal wire;

wherein the light strip uses the slot for clamping and securing to the metal wire, such that the light strip, which has a continuously extending elongated shape, is installed and fixed to the stand portion along the metal wire, which also has a continuously extending elongated shape, thereby forming a planar or three-dimensional shaped light ornament.

18. The shaped light ornament according to claim 17, wherein a projection of the slot in the extension direction has an arc shape, a width of the opening of the slot is between a radius and a diameter of the slot, and the opening of the slot corresponds to a central angle between 60 and 100 degrees.

19. The shaped light ornament according to claim 17, wherein the light transmissive portion of the flexible member comprises an inner layer and an outer layer, the cavity is provided in the inner layer, the outer layer is provided on an outer side of the inner layer, and the outer layer has lower transmittance than the inner layer.

20. The shaped light ornament according to claim 19, wherein the outer layer is a matte layer for providing a matte light-scattering effect.

* * * * *